United States Patent
Greb et al.

(10) Patent No.: US 10,105,936 B2
(45) Date of Patent: Oct. 23, 2018

(54) METHOD FOR PRODUCING GLASS LAMINATES FROM A LAYERED STRUCTURE CONTAINING A PLASTICISER-CONTAINING POLYVINYL ACETAL FILM AND A POLYVINYL ACETAL FILM WITH A LOW PLASTICISER CONTENT

(71) Applicant: KURARAY EUROPE GMBH, Hattersheim (DE)

(72) Inventors: Marco Greb, Hattersheim (DE); Uwe Keller, Hattersheim (DE)

(73) Assignee: KURARAY EUROPE GMBH, Hattersheim (DE)

( * ) Notice: Subject to any disclaimer, the term of this patent is extended or adjusted under 35 U.S.C. 154(b) by 448 days.

(21) Appl. No.: 14/601,542

(22) Filed: Jan. 21, 2015

(65) Prior Publication Data

US 2015/0217547 A1    Aug. 6, 2015

(30) Foreign Application Priority Data

Feb. 5, 2014   (EP) .................................... 14154012

(51) Int. Cl.
| | |
|---|---|
| B32B 17/10 | (2006.01) |
| B32B 37/00 | (2006.01) |
| B32B 37/18 | (2006.01) |
| B32B 27/18 | (2006.01) |
| B32B 27/22 | (2006.01) |
| B32B 27/08 | (2006.01) |

(52) U.S. Cl.
CPC ...... *B32B 37/0038* (2013.01); *B32B 17/1022* (2013.01); *B32B 17/1066* (2013.01); *B32B 17/10192* (2013.01); *B32B 17/10568* (2013.01); *B32B 17/10587* (2013.01); *B32B 17/10761* (2013.01); *B32B 27/08* (2013.01); *B32B 27/18* (2013.01); *B32B 27/22* (2013.01); *B32B 37/18* (2013.01)

(58) Field of Classification Search
CPC .................. B32B 17/10761; B32B 17/10036
USPC .................. 156/106, 308.6, 308.8, 309.3
See application file for complete search history.

(56) References Cited

U.S. PATENT DOCUMENTS

| | | | |
|---|---|---|---|
| 2,400,957 A | 5/1946 | Stamatoff et al. | |
| 3,437,552 A | 4/1969 | Bowen | |
| 3,718,535 A * | 2/1973 | Armstrong | B32B 17/10 156/102 |
| 4,385,951 A * | 5/1983 | Pressau | B32B 17/10036 156/105 |
| 5,500,274 A | 3/1996 | Francis et al. | |
| 6,649,269 B1 * | 11/2003 | Phillips | B32B 17/10577 156/308.6 |
| 6,749,707 B2 * | 6/2004 | Saksa | B32B 17/10036 156/308.6 |
| 7,312,275 B2 | 12/2007 | Papenfuhs et al. | |
| 7,358,304 B2 | 4/2008 | Papenfuhs et al. | |
| 7,511,096 B2 | 3/2009 | Papenfuhs et al. | |
| 7,528,192 B2 | 5/2009 | Papenfuhs et al. | |
| 2004/0234735 A1 * | 11/2004 | Reynolds | B32B 17/10036 428/204 |
| 2005/0131133 A1 * | 6/2005 | Wong | B32B 17/10761 524/557 |
| 2006/0008658 A1 | 1/2006 | Fukatani et al. | |
| 2006/0210776 A1 * | 9/2006 | Lu | B32B 17/10 428/192 |
| 2007/0009714 A1 | 1/2007 | Lee et al. | |
| 2007/0014976 A1 | 1/2007 | Matsudo | |
| 2009/0162671 A1 | 6/2009 | Marumoto | |
| 2012/0171479 A1 | 7/2012 | Fukatani et al. | |
| 2012/0288722 A1 | 11/2012 | Iwamoto et al. | |
| 2013/0337247 A1 * | 12/2013 | Kitano | B32B 27/18 428/213 |

FOREIGN PATENT DOCUMENTS

| | | |
|---|---|---|
| CA | 2388107 A1 | 5/2001 |
| EP | 1227070 A1 | 7/2002 |
| EP | 1235683 | 9/2002 |
| EP | 1527107 | 5/2005 |
| EP | 1606325 | 12/2005 |
| EP | 2489508 A1 | 8/2012 |
| EP | 2610226 A1 | 7/2013 |
| EP | 2674405 A1 | 12/2013 |
| EP | 2679558 A1 | 1/2014 |
| JP | 2007070200 A | 3/2007 |
| WO | 03020776 A1 | 3/2003 |
| WO | 2004005358 A1 | 1/2004 |
| WO | 2004/063232 A1 | 7/2004 |
| WO | 2005059013 A1 | 6/2005 |
| WO | 2004063231 A1 | 7/2007 |
| WO | 0130568 A1 | 5/2011 |
| WO | 2012/115198 A1 | 8/2012 |

* cited by examiner

*Primary Examiner* — Scott W Dodds
(74) *Attorney, Agent, or Firm* — Brooks Kushman P.C.

(57) ABSTRACT

Layered structures consisting of at least one film A containing a polyvinyl acetal PA and at most 16% by weight of plasticizer WA and at least one film B containing a polyvinyl acetal PB and at least 16% by weight plasticizer WB between two glass sheets, are produced by adhering at least one film A to at least one film B or at least one of the glass sheets by means of a liquid. The layered structure can then be pressed to form a composite glass laminate.

19 Claims, No Drawings

METHOD FOR PRODUCING GLASS LAMINATES FROM A LAYERED STRUCTURE CONTAINING A PLASTICISER-CONTAINING POLYVINYL ACETAL FILM AND A POLYVINYL ACETAL FILM WITH A LOW PLASTICISER CONTENT

CROSS-REFERENCE TO RELATED APPLICATIONS

This application claims priority to European Patent Application No. 14154012.0 filed Feb. 5, 2014, the disclosure of which is incorporated in its entirety by reference herein.

BACKGROUND OF THE INVENTION

1. Field of the Invention

The present invention relates to a method for producing glass laminates from a layered structure containing a plasticiser-containing polyvinyl acetal film and a polyvinyl acetal film with a low plasticiser content by means of fixing the polyvinyl acetal film with a low plasticiser content on the plasticiser-containing polyvinyl acetal film.

2. Background Art

In order to produce laminated glass sheets having electrically conductive structures, such as heating wires or antennas, methods are conventional in which either metal filaments are first melted onto the surface of a normal PVB film or are sewn thereinto, or the electrically conductive structures are applied to one of the glass surfaces oriented inwardly in the laminate by means of screen printing and subsequent baking. In both cases, there is the risk of economical losses if faults occur during the application to the normal PVB film or during application to a prepared glass sheet. In the first case, the PVB film can no longer be used for lamination, and in the second case the glass can no longer be used for lamination.

By contrast, the direct printing of PET films with electrically conductive structures is established in part, and for example practically invisible heating elements, sensor fields, etc. can be produced thereon. A disadvantage with an intended integration of such PET films printed with electrically conductive structures, however, is the fact that at least 3 film layers (1×functionalised PET, 2×PVB film) always have to be used, since PET cannot be melted directly on a glass surface via the functionalised side or the rear side.

Another disadvantage is the increased complexity of the film packing, which, due to the combination of the feature "with electrically conductive structures" with further functional features such as "acoustic damping", "band filter", "wedge-shaped thickness profile" and "shade", leads to an increase of the complexity of the film preparation for the processor.

Similar limitations are, of course, also provided with use of PET films functionalised in other ways. For example, it may be desirable to embed, in a laminated safety glass, films that are printed decoratively or with a logo.

When producing laminated glass laminates from a plasticiser-containing polyvinyl acetal film and a polyvinyl acetal film with a low plasticiser content, an exact positioning of the films is difficult due to electrostatic charging, airflow or mechanical shifting. Furthermore, it may be desirable to introduce into a laminated glass laminate thin IR-shielding layers in the form of metal layers or layers based on nanoscale semiconductor particles in addition to one or more used PVB films.

SUMMARY OF THE INVENTION

It has surprisingly been found that films based on polyvinyl acetal with low plasticiser content or no plasticiser content can be fixed with a liquid on a plasticiser-containing film or on a glass sheet by means of adhesion and can thus be positioned in a precise manner.

The interfacial tension between the liquid, the film containing a low level of plasticiser or no plasticiser and the plasticiser-containing film or the glass sheet is sufficiently high for a fixing of the film.

DETAILED DESCRIPTION OF THE PREFERRED EMBODIMENT(S)

The invention therefore relates to method for producing a layered structure consisting of at least one film A containing a polyvinyl acetal PA and at most 16% by weight of plasticiser WA and at least one film B containing a polyvinyl acetal PB and at least 16% by weight of plasticiser WB between two glass sheets, wherein at least one film A is adhered by means of a liquid to at least one film B or at least one of the glass sheets, and wherein the plasticizer content of film B is preferably higher than film A.

The adhesion of films A to films B or to glass sheets causes a fixing of the film A, such that this no longer shifts in the subsequent processing or completion of the layered structure.

In the method according to the invention, film A can be wetted with the liquid by application of the liquid to film A and/or to film B and/or to one of the glass sheets, prior to the combining of the layers to form a layered structure. For example, this is possible in the following variants:

film A is wetted completely or partially with a liquid and is fixed on film B, and both films are combined between two glass sheets to form a layered structure film B is wetted completely or partially with a liquid and film A is fixed thereon, and both films are combined between two glass sheets to form a layered structure film A is wetted completely or partially with a liquid and is fixed on one of the glass sheets and is combined with film B and the second glass sheet to form a layered structure a glass surface or glass sheet is wetted completely or partially with a liquid, and film A is fixed thereon and is combined with film B and the second glass sheet to form a layered structure.

In a further method step the layered structure thus obtained can be pressed to form a laminated glass laminate.

The wetting of film A with the liquid in accordance with the invention can be performed as the films are combined to form a layered structure and/or on one of the glass sheets prior to the combination of the layers to form a layered structure by applying the liquid to film A and/or to film B. The liquid can be applied by usual methods, such as spraying, drop formation or printing.

An organic liquid, preferably with a boiling point of more than 120° C., can be used as the liquid, in particular the plasticiser WA and/or the plasticiser WB of films A and/or B. Furthermore, glycerol, butyl diglycol or dimethylformamide can be used. The use of water is also possible in principle, but poses the risk of producing cloudiness in the films.

Films A optionally have electrically conductive structures on one or both surfaces. Here, electrically conductive structures are understood to be, inter alia, arbitrarily wide or narrow conductive tracks, microwires, areas, networks, points, layers and also combinations thereof.

The electrically conductive structures preferably contain metals, such as silver, copper, gold, indium, zinc, iron and aluminium. Alternatively or in combination therewith, semiconductor materials however can also be arranged in or on film A. Furthermore, conductive materials based on carbon, such as graphite, CNT (carbon nanotubes) or graphene, can be contained.

Alternatively or additionally to electrically conductive structures, the films A can have, on one or both surfaces, layers that at least partly shield heat radiation, or nanoparticles. The heat radiation-shielding layers can be present in the form of metal layers or layers containing nanoscale semiconductor particles.

In a further embodiment of the invention, the films A are at least partly not transparent and/or coloured and/or opaque. The non-transparent and/or coloured and/or optical areas of the films can be obtained by inkjet printing, screen printing or lamination.

Furthermore, film A can be printed, for example with decorative elements such as images, logos or drawings, or with informative elements, such as lettering, advertising, company information or product information. This can be achieved using the known printing methods and inks or printing inks.

All surface treatments of the film A (electrically conductive structures, heat radiation-shielding layers or non-transparent, coloured or opaque surfaces) can be produced on the surface of the film A by different variants of printing methods, such as screen printing, flexographic printing or gravure printing, vapour deposition, sputtering or electrodeposition. In the case of printing methods, appropriate inks are used, which in some circumstances generally can also be dried or thermally or photonically cured prior to the lamination. The electrically conductive structures can also be carved out in the end form thereof from an initially coarser structure on the film A only by the use of lasers of other processing means (engraving, etching).

With the use of printing methods ("printed electronics"), the inks or printing inks used may contain conductive particles. These can be particles formed from metals, such as gold, silver, copper, zinc, iron or aluminium, as well as materials coated with metals, such as silver-plated glass fibres, glass beads, and also conductive carbon black, carbon nanotubes, graphite or graphene. Furthermore, particles formed from semiconductors such as conductive metal oxides, for example indium-doped tin oxide, doped zinc oxides and antimony-doped tin oxide, can also be used.

The surface treatments can lead to electromagnetic shielding of frequency fields and/or to production of electrical circuits such as conductive tracks or transmitting and/or receiving antennas. By way of example, heating elements or antennas can thus be introduced into the glass composite. Antennas can be used for example in the automotive sector to receive radio waves or in car-to-car communication.

The electrically conductive structures of the films A can also be formed as contact sensors, which enables the production of interactive laminated glass sheets. For example, information input at the laminated glass sheet (for example a windscreen or side glazing of a motor vehicle or the glass pane of a door) can thus be used for access control.

With multi-layered superstructures of electronic elements, that is to say conductive and dielectric structures, entire electronic switching circuits or components can additionally be applied. These include, inter alia, transistors, resistors, chips, sensors, displays, light-emitting diodes (for example OLEDs) and/or smart labels.

The electrically conductive structures in the case of filaments may be so small that they can be identified only with great difficulty with the naked eye. This is the case with widths from 10 to 30 μm, preferably 1 to 20 μm, and most preferably 1 to 15 μm. In particular in the case of flat heating fields, the width of the filaments is less than 25 μm. Heating fields can also be introduced only locally, for example before an optical sensor system on an upper face of a windscreen. The electrically conductive structures used in accordance with the invention preferably have thicknesses in the range of 0.1-50 μm, more preferably in the range of 0.5-20 μm and most preferably in the range of 1-10 μm auf.

In a further variant of the invention the film A may have a smaller surface area than the film B. This leads, relative the film A, to the fact that the film B is in direct contact in a sub-area with a glass sheet. Film A may also have at least one opening, such that the film B is in direct contact through this opening with the glass sheet resting against A. Here, the advantage is that film A, optionally with one of the mentioned surface treatments, can be positioned in a versatile manner at any points of an automotive glazing panel without filling out the entire sheet.

Hereinafter, the term "starting state" is understood to mean the state of the films A and B prior to lamination, that is to say, still in the separated state.

The films A and B may contain, in the starting state prior to lamination of the layers and also in the intermediate layer stack located in the laminated glass laminate, a single plasticiser as well as mixtures of plasticisers both of different and identical composition. The term "different composition" refers to both the type of plasticiser and proportion thereof in the mixture. Film A and film B after lamination, that is to say in the finished laminated glass, preferably have the same plasticisers WA and WB. In a preferred variant, film A in its starting state, however, does not contain any plasticiser and after lamination contains the plasticiser WB.

Plasticiser-containing films B used in accordance with the invention contain, in the starting state prior to lamination of the layers, at least 16% by weight, such as 16.1-36.0% by weight, preferably 22.0-32.0% by weight and in particular 26.0-30.0% by weight, of plasticiser.

Films A used in accordance with the invention may contain, in the starting state prior to lamination of the layers, less than 16% by weight (such as 15.9% by weight), less than 12% by weight, less than 8% by weight, less than 6% by weight, less than 4% by weight, less than 3% by weight, less than 2% by weight, less than 1% by weight or even no plasticiser (0.0% by weight). Films A with a low plasticiser content preferably contain 0.0-8% by weight of plasticiser.

In the method according to the invention, the film A in the starting state prior to lamination of the layers has a thickness of no more than 20%, preferably 15%, and preferably no more than 10% of the thickness of the film or films B. The thickness of film A includes the electrically conductive structure.

The thickness of a film A in the starting state prior to lamination of the layers is 10-150 μm, preferably 20-120 μm, more preferably 30-100 μm, yet more preferably 40-80 μm and most preferably 50-70 μm. In the laminated glass, the thickness of the film increases by transfer of plasticiser from film B.

Film A is produced separately from film B (for example extruded) and has either no plasticiser at all or such a small proportion of plasticiser that it neither expands too severely nor is too tacky during the production and further processing under mechanical load.

The thickness of a film B in the starting state is 450-2500 µm, more preferably 600-1000 µm, and most preferably 700-900 µm. With use of a plurality of films B, the same is true for the total thickness thereof. If films B are stretched prior to production of the sandwich and/or additionally are adapted to the shape of a screen (for example a windscreen) in a curved manner, the specified thicknesses at the moment of lamination may reduce once more by up to 20%.

The film A can be applied via a surface-treated side to a glass surface of the layered structure according to the invention. It is also possible to apply a film A to both glass surfaces, such that a layered structure with a layer sequence film A/film B/film A or a laminated glass laminate with a layer sequence glass/film A/film B/film A/glass is obtained.

A surface treatment of the films A may be the same or different. By way of example, one of the films A may have the electrically conductive structure, and the second film A may have heat-absorbing layers or other layers having optical functions (transparency).

In the case of automotive glazings, it is not preferable for aesthetic and stability reasons to seal the edges of the laminated glass laminates with sealants. This promotes the susceptibility of such glazings to the formation of edge defects, such as detachments of the layers from one another (delaminations) or corrosion or chemical modification of an electrically conductive structure reaching as far as the edge of the laminate.

In the method according to the invention, the film A having a low plasticiser content can be tailor cut and positioned such that it does not reach everywhere in the layered structure or laminated glass laminate as far as the edge of the laminate. In particular, the film A can be smaller in the edge region by at least 1 mm compared with at least one glass sheet, such that the film B in this edge region is in direct contact with at least one glass sheet.

Furthermore, the thin film A, which has a low plasticiser content or even no plasticiser content in the starting state, can be perforated prior to the insertion into the glass/film sandwich, such that it can have openings, such as passages, holes or slits, in any geometric patterns.

The film A can thus have at least one opening, such that by means of this opening the film B is in direct contact with at least one glass sheet. Following adhesive bonding to form the finished laminated glass, the film B with higher plasticiser content in the starting state is adhesively bonded at these points to the glass sheets without interruption. In particular, openings can thus be obtained at points of the laminated glass behind which the function of optics elements and/or antenna elements would otherwise be hindered by an electrically conductive structure.

The films A and B used in accordance with the invention contain polyvinyl acetals, which are produced by acetalisation of polyvinyl alcohol or ethylene vinyl alcohol copolymer.

The films can contain polyvinyl acetals, each having a different polyvinyl alcohol content, degree of acetalisation, residual acetate content, ethylene proportion, molecular weight and/or different chain lengths of the aldehyde of the acetal groups.

In particular, the aldehydes or keto compounds used for the production of the polyvinyl acetals can be linear or branched (that is to say of the "n" or "iso" type) containing 2 to 10 carbon atoms, which leads to corresponding linear or branched acetal groups. The polyvinyl acetals are referred to accordingly as "polyvinyl (iso)acetals" or "polyvinyl (n)acetals".

The polyvinyl (n)acetal used in accordance with the invention results in particular from the reaction of at least one polyvinyl alcohol with one or more aliphatic unbranched keto-compounds containing 2 to 10 carbon atoms. To this end, n-butyraldehyde is preferably used.

The polyvinyl alcohols or ethylene vinyl alcohol copolymers used to produce the polyvinyl acetals in the films A or B may be identical or different, pure or a mixture of polyvinyl alcohols or ethylene vinyl alcohol copolymers with different degree of polymerisation or degree of hydrolysis.

The polyvinyl acetate content of the polyvinyl acetals in the films A or B can be set by use of a polyvinyl alcohol or ethylene vinyl alcohol copolymer saponified to an appropriate degree. The polarity of the polyvinyl acetal is influenced by the polyvinyl acetate content, whereby the plasticiser compatibility and the mechanical strength of the respective layer also change. It is also possible to carry out the acetalisation of the polyvinyl alcohols or ethylene vinyl alcohol copolymers with a mixture of a number of aldehydes or keto compounds.

The films A or B preferably contain polyvinyl acetals having a proportion of polyvinyl acetate groups based on the layers, either identically or differently, of 0.1 to 20 mol %, preferably 0.5 to 3 mol %, or 5 to 8 mol %.

The polyvinyl alcohol content of the polyvinyl acetals PA of film A having a lower plasticiser content in the starting state may be between 6-26% by weight, 8-24% by weight, 10-22% by weight, 12-21% by weight, 14-20% by weight, 16-19% by weight and preferably between 16 and 21% by weight or 10-16% by weight.

The polyvinyl alcohol content of the polyvinyl acetals PB of film B, which is richer in plasticiser in the starting state, may be between 14-26% by weight, 16-24% by weight, 17-23% by weight and preferably between 18 and 21% by weight.

The films A or B preferably contain uncrosslinked polyvinyl acetal. The use of crosslinked polyvinyl acetals is also possible. Methods for crosslinking polyvinyl acetals are described, for example, in EP 1527107 B1 and WO 2004/063231 A1 (thermal self-crosslinking of polyvinyl acetals containing carboxyl groups), EP 1606325 A1 (polyvinyl acetals crosslinked with polyaldehydes) and WO 03/020776 A1 (polyvinyl acetal crosslinked with glyoxylic acid).

Films A and/or B in accordance with the invention may contain, as plasticiser, one or more compounds selected from the following groups:

esters of polyvalent aliphatic or aromatic acids, for example dialkyl adipates, such as dihexyl adipate, dioctyl adipate, hexyl cyclohexyl adipate, mixtures of heptyl adipates and nonyl adipates, diisononyl adipate, heptyl nonyl adipate, and esters of adipic acid with cycloaliphatic ester alcohols or ester alcohols containing ether compounds, dialkyl sebacates, such as dibutyl sebacate, and also esters of sebacic acid with cycloaliphatic ester alcohols or ester alcohols containing ether compounds, esters of phthalic acid, such as butyl benzyl phthalate or bis-2-butoxyethyl phthalate.

esters or ethers of polyvalent aliphatic or aromatic alcohols or oligo ether glycols with one or more unbranched or branched aliphatic or aromatic substituents, for example esters of glycerol, diglycols, triglycols or tetraglycols with linear or branched aliphatic or cycloaliphatic carboxylic acids; Examples of the latter group include diethylene glycol-bis-(2-ethyl hexanoate), triethylene glycol-bis-(2-ethyl hexanoate), triethylene glycol-bis-(2-ethyl butanoate), tetraethylene glycol-bis-n-heptanoate, triethylene glycol-bis-n-heptanoate, triethylene glycol-bis-n-hexanoate, tetraethylene glycol dimethyl ether and/or dipropylene glycol benzoate phosphates with aliphatic or aromatic ester alcohols, such as tris(2-ethylhexyl)phosphate (TOF), triethyl phosphate, diphenyl-2-ethylhexyl phosphate, and/or tricresyl phosphate esters of citric acid, succinic acid and/or fumaric acid Films A in the variants in which a plasticiser WA is present in film A in the starting state, and also films B particularly preferably contain 1,2-cyclohexane dicarboxylic acid diisononyl ester (DINCH) or triethylene glycol-bis-2-ethyl hexanoate (3GO or 3G8) as plasticisers.

In addition, films A and B may contain further additives, such as residual quantities of water, UV absorber, antioxidants, adhesion regulators, optical brighteners or fluorescent additives, stabilisers, colorants, processing aids, organic or inorganic nanoparticles, pyrogenic silicic acid and/or surface active substances. In particular, film B may comprise 0.001 to 0.1% by weight of alkaline salts and/or alkaline earth salts of carboxylic acids as adhesion regulators.

In order to eliminate corrosion effects of the electrically conductive structures introduced via film A into the laminated glass, in particular with use of metal conductor materials, such as silver, it may be helpful to provide an anti-corrosion agent in the finished laminate. The anti-corrosion agent can preferably be contained in film B prior to lamination and, both during and after the adhesive bonding to film A, can also transfer by means of diffusion into the thinner film A or into the region of the coating thereof. Alternatively, the anti-corrosion agent is already contained in film A prior to lamination. Anti-corrosion agents are preferably used in proportions of 0.005-5% by weight in film B and/or A. Unsubstituted or substituted benzotriazoles are preferably used as anti-corrosion agent.

In order to avoid corrosion at the conductive structures, film A more preferably comprises less than 150 ppm chloride ions and/or nitrate ions and/or sulphate ions.

The chloride content of the film A can thus be less than 150 ppm, preferably less than 100 ppm, and in particular less than 50 ppm. In the ideal case, the chloride content of the film A is less than 10 ppm or even 0 ppm.

The nitrate content of film A optionally may be less than 150 ppm, preferably less than 100 ppm, and in particular less than 50 ppm. In the ideal case, the nitrate content of film A is less than 10 ppm or even 0 ppm.

Again optionally, the sulphate content of film A may be less than 150 ppm, preferably less than 100 ppm, and in particular less than 50 ppm. In the ideal case, the sulphate content of the film A is less than 10 ppm or even 0 ppm.

Film A additionally may comprise more than 0 ppm magnesium ions. The magnesium content is preferably more than 5 ppm, more preferably 10 ppm, and in particular 5-20 ppm.

The present invention also relates to a method for producing laminated glazings by pressing (lamination) of the layered structure under increased or reduced pressure and increased temperature.

To laminate the layered structure, the methods with which a person skilled in the art is familiar can be used, with and without prior production of a pre-laminate.

What are known as autoclave processes are carried out at an increased pressure from approximately 10 to 15 bar and temperatures from 100 to 145° C. over approximately 2 hours. Vacuum bag or vacuum ring methods, for example according to EP 1 235 683 B1, function at approximately 200 mbar and 130 to 145° C.

What are known as vacuum laminators can also be used. These consist of a chamber that can be heated and evacuated, in which laminated glazings can be laminated within 30-60 minutes. Reduced pressures from 0.01 to 300 mbar and temperatures from 100 to 200° C., in particular 130-160° C., have proven their worth in practice.

The method can be carried out in many variants. For example, film A is easily removed from a roll of an appropriate width, whereas film B has been tailor-cut beforehand to the size of the laminated glass to be produced. This is advantageous in particular in the case of windscreens and other automotive glazing parts. In this case, it is particularly advantageous to additionally still stretch the thicker film B before it is tailor cut. This enables a more economical use of film, or, for the case in which film B has a colour tint, allows the adaptation of the curvature thereof to the upper sheet edge.

In the automotive field, in particular for the production of windscreens, films that have what is known as an ink ribbon in the upper region are often used. To this end, either the upper part of films A and B can be co-extruded with a suitably coloured polymer melt, or there may be a different colouration in some areas in a multi-layer system of one of the films A and B. In the present invention, this can be achieved by complete or partial colouring of at least one of the films A and B.

Films B may therefore have a colour tint, which in particular has already been adapted in a prior process step to the geometry of a windscreen.

It is also possible for the films B to have a wedge-shaped thickness profile. The laminated glass laminate according to the invention obtains a wedge-shaped thickness profile even with plane-parallel thickness profile of the film A and can be used in motor vehicle windscreens for HUD displays.

In the simplest case, film B is a commercially available PVB film with or without ink ribbon and with or without a wedge-like thickness profile. Films B with nanoparticles dispersed therein for IR protection can also be used as coloured films. Of course, a film B may also be a film having an acoustic function, such that soundproofing properties that are further improved are obtained by combination with a film A. Of course, a film B may already also combine a number of the mentioned functions.

The thin films A are generally produced by extrusion with use of a cast-film line or in the form of a blown film. Here, a surface roughness may also be produced by controlled flow crack or with the cast-film method additionally by use of a structured chill roll.

In addition, a film already produced can be embossed with a regular, non-stochastic roughness by means of an embossing process between at least one cylinder pair. Films used in accordance with the invention preferably have a one-sided surface structure with a roughness Rz from 0 to 25 µm, preferably an Rz from 1 to 20 µm, more preferably an Rz from 3 to 15 µm, and in particular an Rz from 4 to 12 µm. It is particularly preferable if the side of film A coming into contact with the glass sheet has a surface roughness Rz of no more than 20% of its thickness. The surface provided with the electrically conductive structure preferably has a particularly low surface roughness prior to application of the coating. Preferably, the roughness parameter Ra is less than 3 µm and Rz is less than 5 µm.

While embodiments of the invention have been illustrated and described, it is not intended that these embodiments illustrate and describe all possible forms of the invention.

Rather, the words used in the specification are words of description rather than limitation, and it is understood that various changes may be made without departing from the spirit and scope of the invention.

What is claimed is:

1. A method for producing a layered structure comprising at least one film A containing a polyvinyl acetal PA and at most 16% by weight of plasticiser WA and at least one film B containing a polyvinyl acetal PB and at least 16% by weight plasticiser WB and two glass sheets, comprising applying an organic liquid having a boiling point of more than 120° C. to at least one film A and/or to at least one film B to wet the film or films, adhering films A and B to each other by means of the liquid, and then contacting the adhering films A and B with the glass sheets to form a laminatable composite, and laminating the composite to form the layered structure.

2. The method of claim 1, wherein the liquid comprises plasticiser WA and/or plasticiser WB.

3. The method of claim 1, wherein film A and/or a glass surface is/are wetted with the liquid by spraying, painting, placement of drops or printing.

4. The method of claim 1, wherein the film A comprises a polyvinyl acetal PA with a proportion of vinyl alcohol groups of from 6 to 26% by weight and the film B comprises a polyvinyl acetal PB with a proportion of vinyl alcohol groups of from 14 to 26% by weight.

5. The method of claim 1, wherein film A has a smaller surface area than film B such that film B extends beyond film A when films A and B are joined together.

6. The method of claim 1, wherein film A has electrically conductive structures.

7. The method of claim 6, wherein the film A is printed.

8. The method of claim 1, wherein film A is at least partly non-transparent and/or coloured and/or opaque.

9. The method of claim 1, wherein film A at least a portion thereof has heat radiation-shielding layers or nanoparticles.

10. The method of claim 1, wherein the film B is acoustically damping.

11. The method of claim 1, wherein film B has a coloured area.

12. The method of claim 1, wherein film B has a wedge-shaped thickness profile.

13. The method of claim 1, wherein film A contains 0 to 8 wt. % of plasticizer WA prior to applying the liquid.

14. The method of claim 1, wherein following forming an assembly of said two glass panes and films A and B, the assembly is laminated in an autoclave.

15. The method of claim 1, wherein a thickness of film A prior to laminating is 20% or less of a thickness of film B prior to laminating.

16. A method for producing a layered structure comprising at least one film A containing a polyvinyl acetal PA and at most 16% by weight of plasticizer WA and at least one film B containing a polyvinyl acetal PB and at least 16% by weight plasticizer WB between two glass sheets, comprising adhering at least one film A to at least one film B by means of an organic liquid having a boiling point of more than 120° C., wherein film A has at least one opening, such that by means of this opening the film B is in direct contact with the glass sheet bearing against film A.

17. An autoclave process for preparing a laminated safety glass comprising two glass panes and a multilayer laminating film comprising at least film A comprising polyvinyl acetal PA and 0-16 wt. % of plasticizer WA, and at least one film B comprising polyvinyl acetal PB and 16 wt. % or more of plasticizer WB, the content of plasticizer WB in film B being greater than the content of plasticizer WA in film A on a weight percentage basis, comprising wetting a surface of film A which will contact film B and/or wetting a surface of film B which will contact film A with an organic liquid having a boiling point of more than 120° C., adhering films A and B together by means of the organic liquid to form a multilayer film, positioning the multilayer film between two glass panes, and autoclaving a composite thus produced in an autoclave to form a laminated glass.

18. The process of claim 17, wherein film A has a content of plasticizer WA of from 0% to 8% prior to laminating.

19. The process of claim 17, wherein a thickness of film A prior to laminating is 20% or less of a thickness of film B prior to laminating.

* * * * *